(12) United States Patent
Lartey

(10) Patent No.: US 12,409,781 B1
(45) Date of Patent: Sep. 9, 2025

(54) REARVIEW MIRROR WITH INTEGRATED HANDICAP SIGN

(71) Applicant: Seth O. Lartey, Winston-Salem, NC (US)

(72) Inventor: Seth O. Lartey, Winston-Salem, NC (US)

(73) Assignee: ZIKI INTERNATIONAL HOLDING GROUP, INC., Winston-Salem, NC (US)

( * ) Notice: Subject to any disclaimer, the term of this patent is extended or adjusted under 35 U.S.C. 154(b) by 148 days.

(21) Appl. No.: 18/123,806

(22) Filed: Mar. 20, 2023

Related U.S. Application Data

(60) Provisional application No. 63/321,662, filed on Mar. 18, 2022.

(51) Int. Cl.
| | | |
|---|---|---|
| *G09F 21/04* | (2006.01) | |
| *B60R 1/12* | (2006.01) | |
| *G09F 7/20* | (2006.01) | |
| *G09F 7/18* | (2006.01) | |

(52) U.S. Cl.
CPC ............... *B60R 1/12* (2013.01); *G09F 7/20* (2013.01); *G09F 21/04* (2013.01); *G09F 2007/1843* (2013.01); *G09F 2007/1865* (2013.01); *G09F 2007/1873* (2013.01)

(58) Field of Classification Search
CPC ... B60R 1/12; G09F 7/20; G09F 21/04; G09F 2007/1843; G09F 2007/1865; G09F 2007/1873; G09F 11/18; G09F 11/29; G09F 15/0025; G09F 15/0062; G09F 17/00

USPC ......... 297/97.1–97.13; 40/514–517; 160/127
See application file for complete search history.

(56) References Cited

U.S. PATENT DOCUMENTS

| | | | | | |
|---|---|---|---|---|---|
| 1,590,048 | A | * | 6/1926 | Mettel | B60J 3/02 296/97.5 |
| 1,835,253 | A | * | 12/1931 | Wilson | B60R 1/12 281/12 |
| 2,747,927 | A | * | 5/1956 | Burkhead | B60J 1/2063 160/242 |
| 3,584,910 | A | * | 6/1971 | Lupul | B60J 3/02 296/97.8 |
| 4,794,715 | A | * | 1/1989 | Cherwin | B60J 1/2038 40/643 |
| 4,825,571 | A | * | 5/1989 | Jennings | G09D 3/10 40/116 |

(Continued)

Primary Examiner — Cassandra Davis
(74) Attorney, Agent, or Firm — EVERMAN LAW FIRM, P.A.; Gregory R. Everman

(57) ABSTRACT

A rearview mirror with integrated sign (the "device") being attachable to a rearview mirror of a vehicle. The device has at least one clamp, each with a moveable jaw and a fixed jaw, for attaching the device to the rearview mirror. The moveable jaw can be manually moved away from the fixed jaw to place the device on, or remove the device from, the rearview mirror. Upon placing the device in position on the rearview mirror, a spring basis the moveable clamp towards the fixed clamp with sufficient force to hold the device onto the rearview mirror. The device includes a sign with indicia thereon, for example a handicap symbol. The device includes a power drive assembly and/or manual drive assembly to selectively deploy the sign so that indicia on the sign is viewable or retract the sign to a stowed position that is principally within the housing.

18 Claims, 6 Drawing Sheets

(56) References Cited

U.S. PATENT DOCUMENTS 5,076,633 A * 12/1991 Hsu ..................... B60J 3/0204
                                                              160/310
2007/0289179 A1 * 12/2007 Mortensen ............. G09F 11/30
                                                              40/617

* cited by examiner

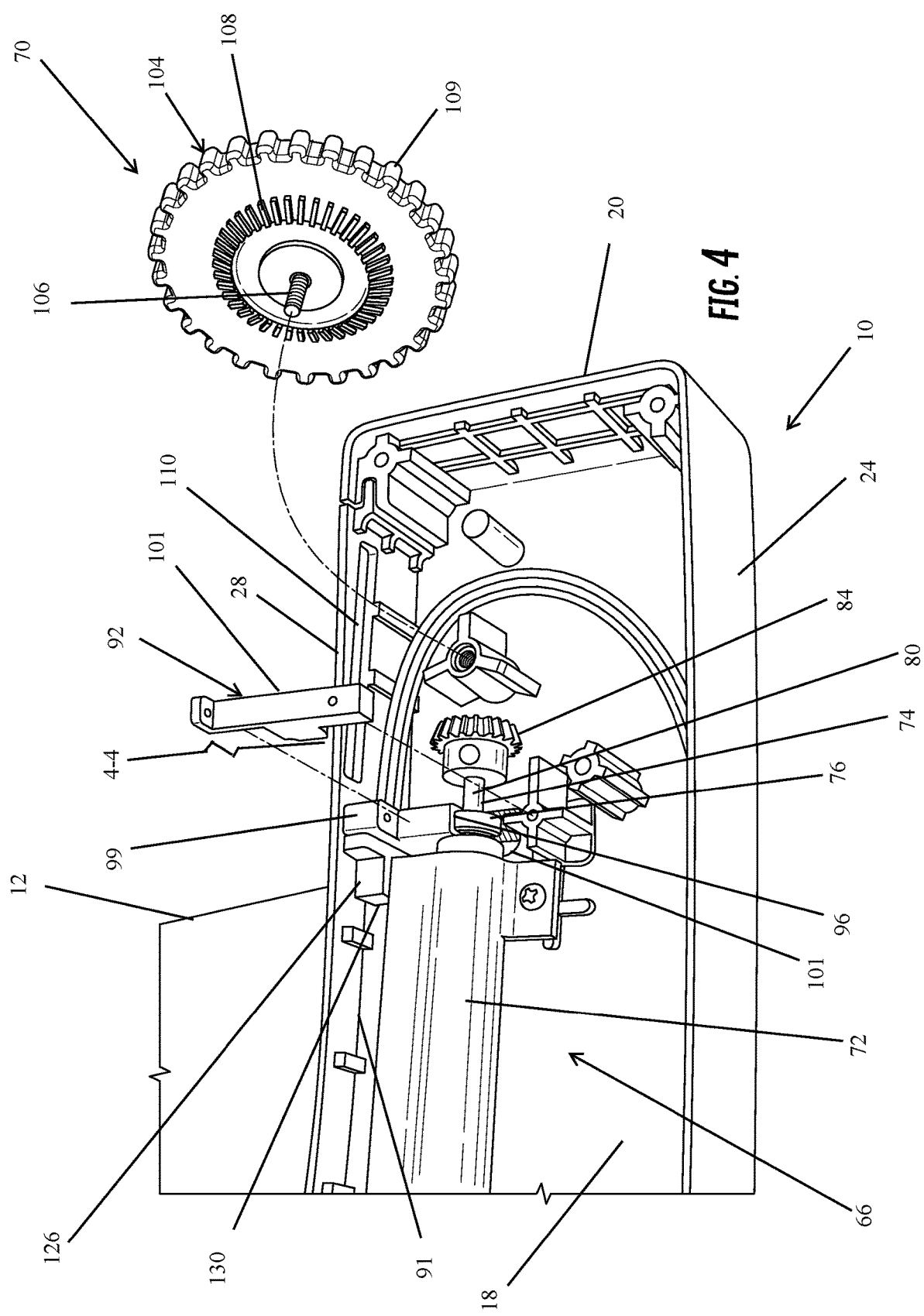

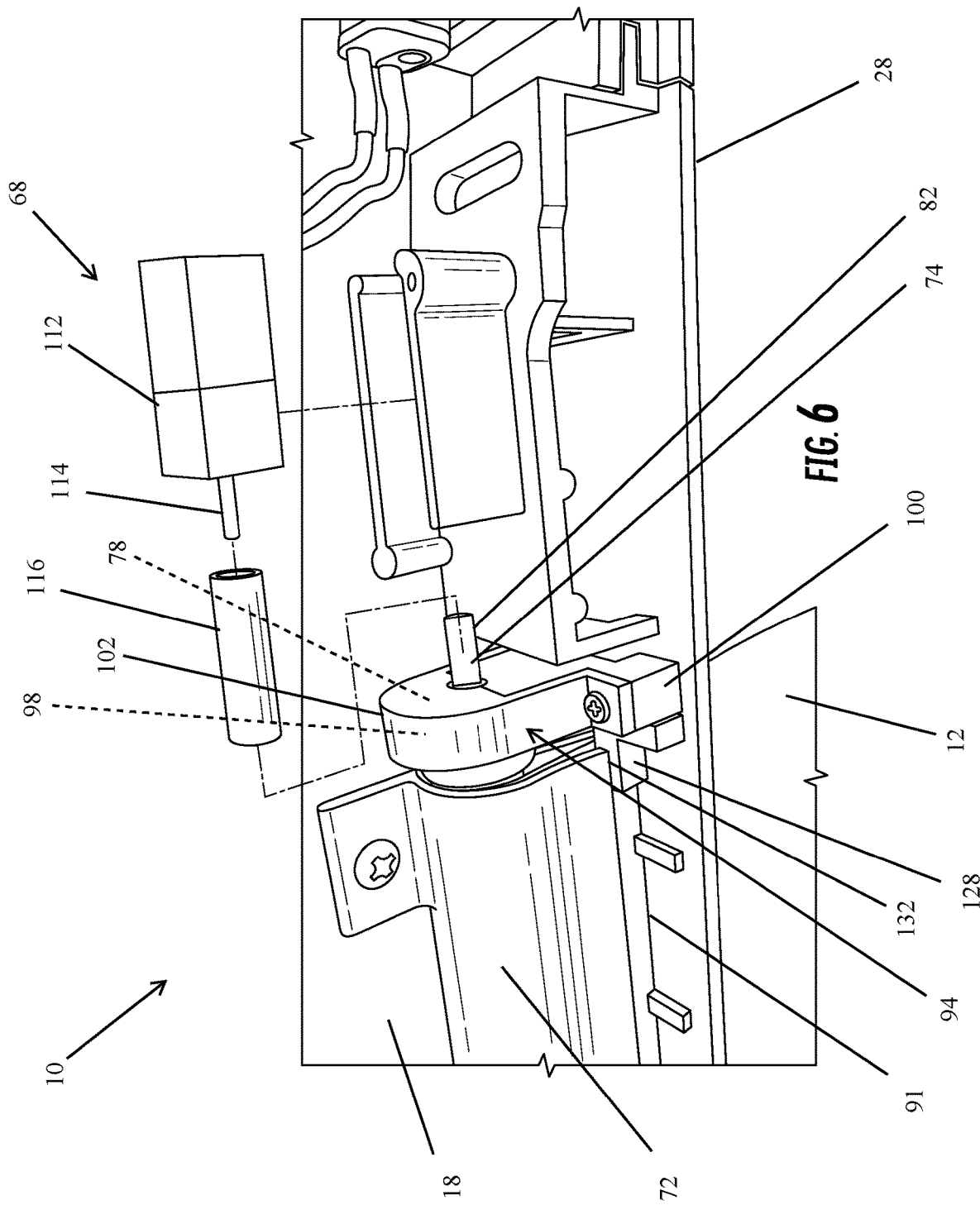

REARVIEW MIRROR WITH INTEGRATED HANDICAP SIGN

CROSS REFERENCE TO RELATED APPLICATIONS

This application claims the benefit of U.S. Provisional Application No. 63/321,662, filed Mar. 18, 2022, which is incorporated herein by reference.

FIELD OF THE INVENTION

The present invention relates generally to handicap signs. More particularly, the invention is a rearview mirror for a vehicle that includes an integrated handicap sign. In an advantageous embodiment, the invention allows for a handicap sign to be selectively extended from a rearview mirror to a displayed position and retracted to a stowed position within the rearview mirror.

BACKGROUND OF THE INVENTION AND RELATED ART

Handicap parking permits are designed to help individuals with conditions that impact their ability to walk short distances. The type of disability can range widely, from vision loss to a cardiac condition to an ambulatory limitation. One of the most common reasons people utilize handicap parking permits is because of limited mobility. This means that an individual is unable to walk short distances without the use of an assistive device like a cane, walker, or wheelchair.

There are many conditions that can cause limited mobility. For example, chronic illnesses like lupus, inflammatory bowel disease, obesity and asthma can all result in an inability to walk far distances. Many people who suffer arthritis, whether it's osteoarthritis, rheumatoid, or gouty, experience loss of mobility. Loss of mobility can also be due to a serious injury; particularly an injury to the spinal cord, which results in tremors or muscle weakness and even paralysis-all of which can impact the ability to walk or move. Additionally, neurodegenerative disorders such as Parkinson's or multiple sclerosis impair motor function which can greatly affect the ability to walk.

Handicap signs are used to identify handicapped accessible and designated parking spots. Whereas handicap signs on a vehicle signify that an occupant of the vehicle is disabled and, therefore, the vehicle is allowed to be parked in a handicapped designated parking space. Typically, such a vehicle would have a rear license plate with a symbol thereon of a person in a wheelchair.

In addition to a disability license plate, a handicap sticker or tag is often placed in or on the vehicle. This secondary notice allows for others to view the handicap status from a direction other than from behind the vehicle. For example, a handicap sticker may be placed on a windscreen or on the exterior body or fender of a vehicle.

For various reasons, a person may desire to selectively either display or not display a handicap sticker. Disadvantageously, a sticker is intended to be permanent or at least remain affixed in position for an extended time. As such, a person cannot selectively and repeatedly move the sticker between an affixed display location and being removed, that is, non-displayed. Another disadvantage is that a sticker affixed to a windscreen blocks the line-of-sight therethrough and leaves a sticky residue when removed.

Similar disadvantages occur by affixing the sticker to the body or fender of a vehicle. That is, the handicap sticker cannot be selectively and repeatedly affixed in a displayed position then removed from sight. And removal of the sticker would leave an undesired sticky residue and possibly damage the paint of the vehicle.

Placards having a handicap symbol allow for the sign to be selectively displayed or stowed, thereby overcoming the permanency issue of stickers. Placards can be loose or in hang tag configuration with a hook for hanging from a rearview mirror. Nonetheless, placards have their own disadvantages.

Loose placards are typically laid on top of the dashboard of a vehicle. However, by not being affixed to the vehicle, a loose placard can easily slide off the dash during driving and end up on the floor where it may be difficult for a person with a disability to return the sign to the dashboard. In this manner loose placards can become damaged or, since they are easily moved, lost.

Hang tag placards are an improvement in that they can be selectively placed in a display position hanging from a rearview mirror or stowed. Nonetheless, the act of attaching to and removing the placard from the rearview mirror is inconvenient and requires a degree of dexterity that some disabled people may find difficult or impossible. Additionally, when hanging from the rearview mirror in the displayed position the placard partially blocks a driver's line of sight through the front windscreen which is a detriment to driving the vehicle. Additionally, when the placard is not being displayed it can easily be lost or become damaged.

As outlined above, conventional handicap stickers and placards have disadvantages in not being, or in the manner that they are, selectively interchangeable between an in-use display position and a stowed position. Accordingly, in view of the aforementioned conventional handicap stickers and placards, there exists a need for an improved handicap sign that can be selectively displayed and stowed. There further exists a need for an improved handicap sign that remains attached to a vehicle regardless of whether the sign is being displayed or stowed. A still further need exists for a handicap sign that can be easily moved from the stowed position to the displayed position and vice versa.

SUMMARY OF THE INVENTION

The invention is a rearview mirror with integrated sign (the "device") being attachable to a rearview mirror of a vehicle. The device has at least one clamp for attaching the device to the rearview mirror. Each of the at least one clamp has a moveable jaw and a fixed jaw. The moveable jaw can be manually moved away from the fixed jaw to place the device on, or remove the device from, the rearview mirror. Upon placing the device in position on the rearview mirror, a spring basis the moveable clamp towards the fixed clamp with sufficient force to hold the device onto the rearview mirror. The device includes a sign with indicia thereon, for example a handicap symbol. The sign can be selectively deployed so that indicia on the sign is external of the housing of the device and viewable or retracted so that the sign is being stowed principally within the housing.

In an aspect, the invention is embodied by a rearview mirror with integrated sign, having a housing; a mirror attached to the housing; at least one clamp attached to the housing, each of said at least one clamp having a moveable jaw and a fixed jaw being adapted for attachment to a rearview mirror; a holder assembly attached to the housing, wherein the holder assembly includes a sign shaft, and wherein the sign shaft is capable of rotational movement; a sign attached to the sign shaft, wherein the sign includes indicia; a slot in the housing adapted for allowing the sign to move there-through; and a power drive assembly functionally attached to the sign shaft and capable of rotating the sign shaft in a first direction to roll up the sign on the sign shaft in a stowed position and rotating the sign shaft in a second direction to deploy the sign so that indicia on the sign are external of the housing. In an embodiment, the power drive assembly includes a motor for rotating the sign shaft and a switch for selectively turning the motor on or off, and for selectively rotating the sign shaft in the first direction or the second direction. In a further embodiment, the device further includes at least one sensor, wherein the sensor signals to stop the motor when the sign reaches the deployed position when deploying the sign, and signals to stop the motor when the sign reaches the stowed position when retracting the sign.

In an aspect, the invention is embodied by a rearview mirror with integrated sign, having a housing; a mirror attached to the housing; at least one clamp attached to the housing, each of said at least one clamp having a moveable jaw and a fixed jaw being adapted for attachment to a rearview mirror; a holder assembly attached to the housing, wherein the holder assembly includes a sign shaft, and wherein the sign shaft is capable of rotational movement; a sign attached to the sign shaft, wherein the sign includes indicia; a slot in the housing adapted for allowing the sign to move there-through; and a manual drive assembly functionally attached to the sign shaft and capable of rotating the sign shaft in a first direction to roll up the sign on the sign shaft in a stowed position and rotating the sign shaft in a second direction to deploy the sign so that indicia on the sign are external of the housing.

In an aspect, the invention is embodied by a rearview mirror with integrated sign, having a housing; a mirror attached to the housing; a holder assembly attached to the housing, wherein the holder assembly includes a sign shaft, and wherein the sign shaft is capable of rotational movement; a sign attached to the sign shaft, wherein the sign includes indicia; a slot in the housing adapted for allowing the sign to move there-through; and a power drive assembly functionally attached to the sign shaft and capable of rotating the sign shaft in a first direction to roll up the sign on the sign shaft in a stowed position and rotating the sign shaft in a second direction to deploy the sign so that indicia on the sign are external of the housing.

Other aspects, objects, features and advantages of the invention will be made apparent or will be readily understood and appreciated by those skilled in the related art as the invention is described in greater detail hereinafter and is shown in the accompanying drawing figures. It is envisioned that all such aspects, objects, features and advantages of the invention as shown and described herein will be within the intended broad scope of the appended claims. The above and other aspects, objects, features and advantages may be accomplished by any of the exemplary embodiments of the invention described herein and illustrated in the accompanying drawings. However, it should be appreciated that the drawing figures are for illustrative purposes only, and that many modifications, changes, revisions and substitutions may be made to the exemplary embodiments illustrated herein without departing from the broadest reasonable interpretation of the appended claims.

BRIEF DESCRIPTION OF THE DRAWINGS

The aforementioned objects, features and advantages of the invention will be more fully understood and appreciated when considered in conjunction with the accompanying drawings.

FIG. 4 is a fragmented top-rear perspective view of the rearview mirror with integrated handicap sign of FIG. 1, showing internal components in the right portion of the device according to an exemplary embodiment of the invention.

FIG. 6 is a fragmented top-rear perspective view of the rearview mirror with integrated handicap sign of FIG. 1, showing internal components in the left portion of the device according to an exemplary embodiment of the invention.

DETAILED DESCRIPTION OF THE EXEMPLARY EMBODIMENTS

Figure 1:
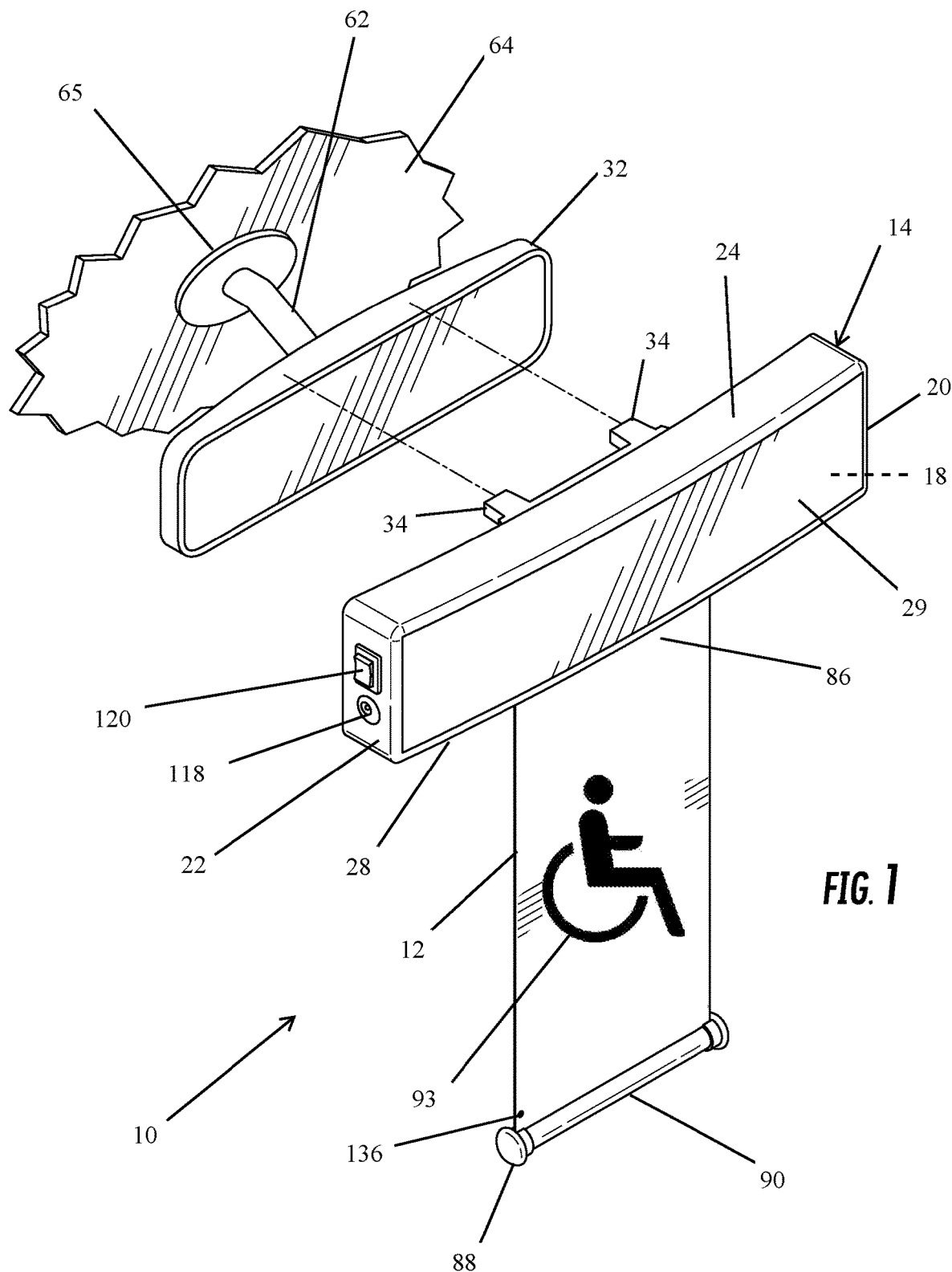
FIG. 1 is an environmental perspective view illustrating a rearview mirror with integrated handicap sign (the "device") according to an exemplary embodiment of the invention.

The present invention will now be described more fully hereinafter with reference to the accompanying drawings in which preferred embodiments of the invention are shown. This invention may, however, be embodied in many different forms and should not be considered as limited to the embodiments set forth herein. These exemplary embodiments are provided so that this disclosure will be both thorough and complete, and will fully convey the scope of the invention to those skilled in the art. Throughout the several views of the drawings, like reference characters designate the same or similar parts.

Figure 2:
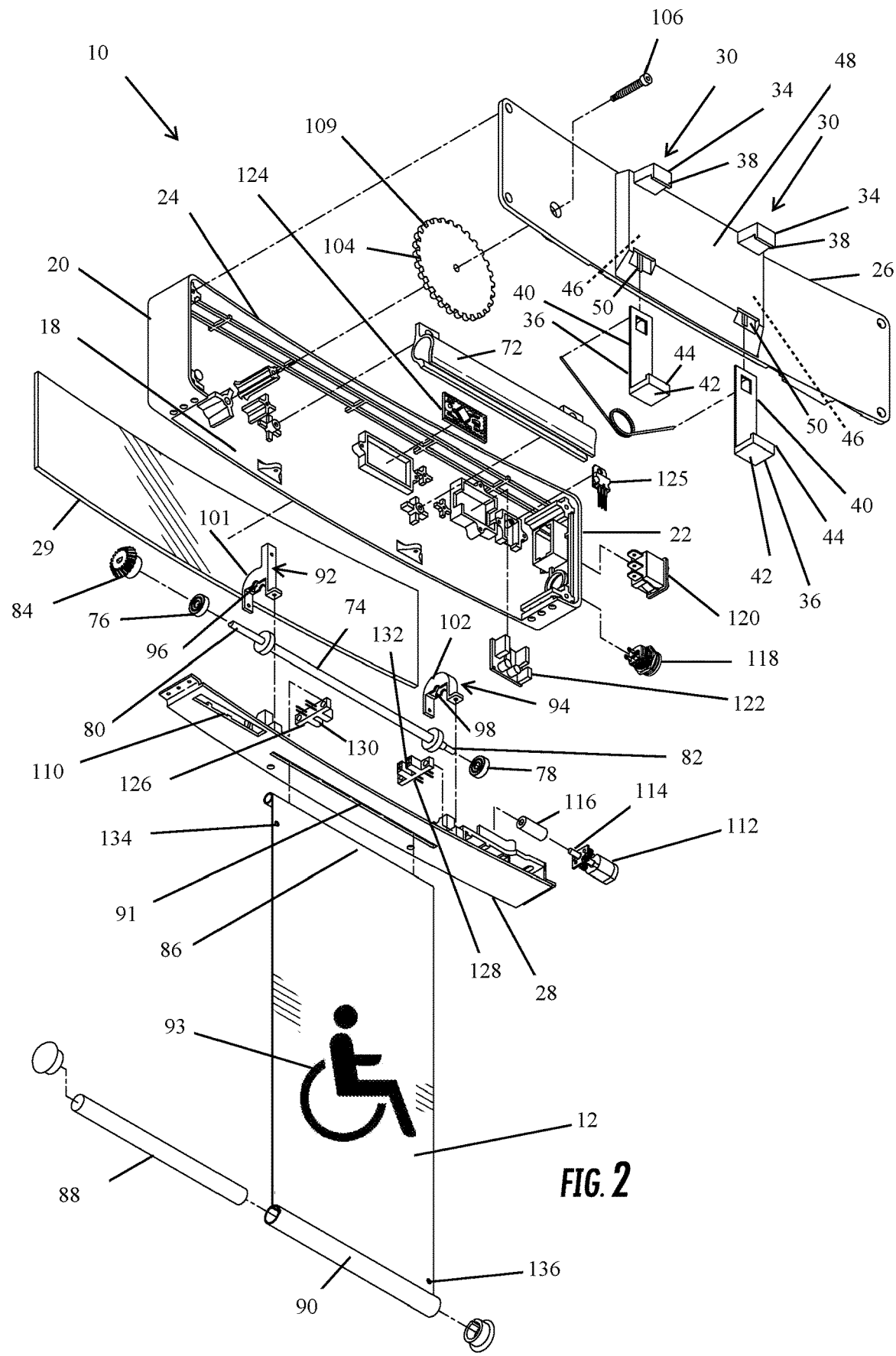
FIG. 2 is an exploded bottom-rear-left perspective view of the rearview mirror with integrated handicap sign of FIG. 1.
Figure 3A:
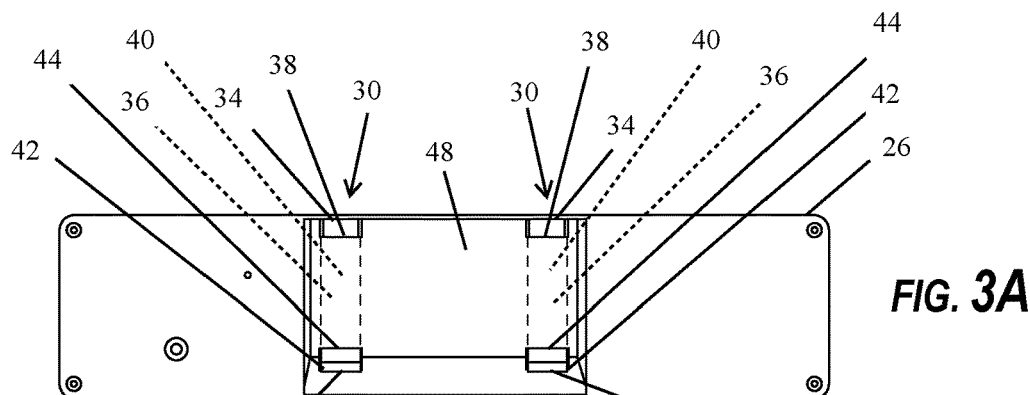
FIG. 3A is a rear view of a back cover of the rearview mirror with integrated handicap sign of FIG. 1, showing a pair of clamps in a closed position for securing the device to a rear-view mirror of a vehicle according to an exemplary embodiment of the invention.
Figure 3B:
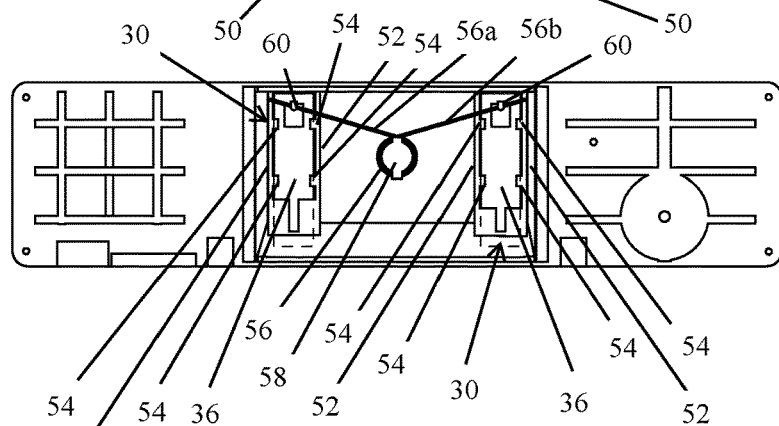
FIG. 3B is an interior front view of the back cover of FIG. 3A.
Figure 3C:
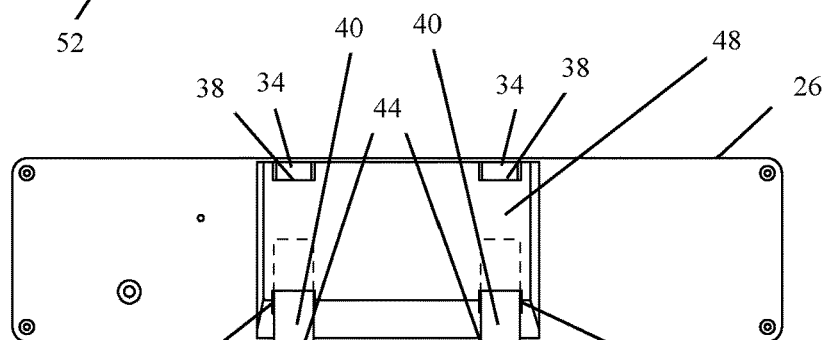
FIG. 3C is a rear view of the back cover of the rearview mirror with integrated handicap sign of FIG. 1, showing the pair of clamps in an open position for attaching or removing the device to a rear-view mirror of a vehicle according to an exemplary embodiment of the invention.
Figure 3D:
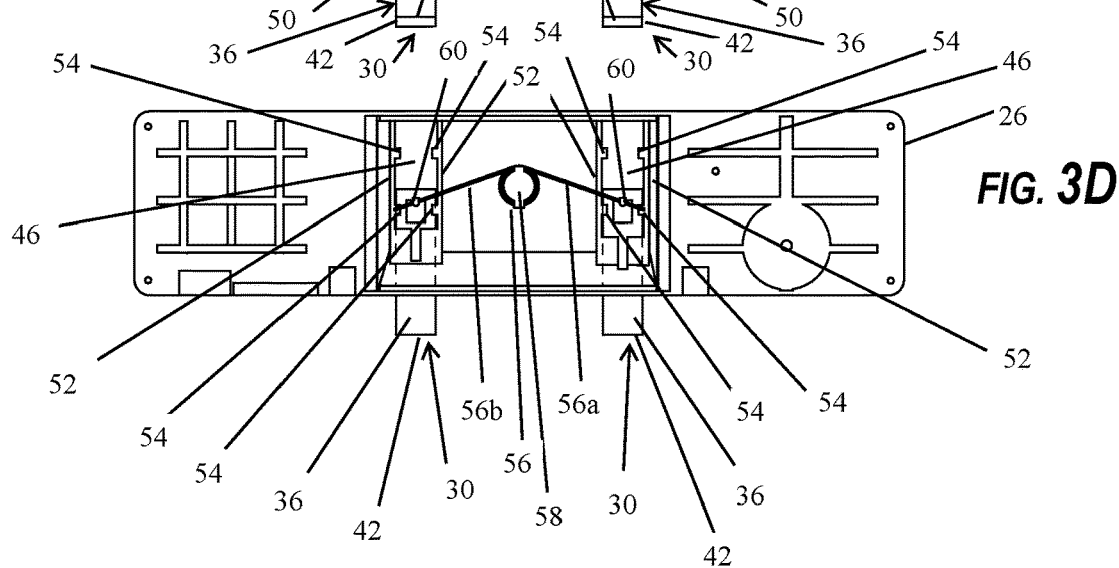
FIG. 3D is an interior front view of the back cover of FIG. 4C.

FIGS. 1-2 show a rearview mirror with integrated handicap sign (also referred to herein as the "device"), designated generally by reference character 10, according to an exemplary embodiment of the invention. The device 10 allows for a sign 12 to be selectively extended therefrom to a display position and retracted to a stowed position within the device 10. Although the sign 12 described and depicted herein is a handicap sign, it is to be understood that the device 10 can be used to display any type of sign 12, slogan, artwork or the like.

The device 10 includes housing 14 having a front 18; left and right sides 20, 22; a top 24; a back cover 26; and a base 28. The front 18 includes a mirror 29 allowing for a driver of a vehicle to view rearwardly behind the vehicle. Preferably, the back cover 26 and/or base 28 can be detached from the main body 16 to allow access to repair internal components as needed.

In a preferred embodiment, the device 10 is an aftermarket product that is attachable via a pair of clamps 30 to a rearview mirror 32 of a vehicle. In an embodiment, each clamp 30 has a fixed jaw 34 and a slidably moveable jaw 36. The clamps 30 are considered to be attached to the housing. Each fixed jaw 34 extends rearwardly from the back cover 26 a distance to span at least a portion of the depth of the rearview mirror 32, preferably about ⅓ inch to ¾ inch, and has a downward directed lip 38 to hold the device 10 in place.

Referring to FIGS. 2 and 3A-D, each movable jaw 36 includes an elongated first section 40, a second section 42 that extends perpendicular to and rearward from the first section 40 (and thusly rearward from the back cover 26) a distance to span at least a portion of the depth of the rearview mirror 32, preferably about ⅓ inch to ¾ inch, and an upward directed lip 44 to hold the device 10 in place.

The first section 42 of each moveable jaw 36 is slidably moveable within a respective channel 46 of the back cover 26. In a preferred embodiment, the back cover 26 includes a raised portion 48 with a pair of openings 50 which form respective entries to the channels 46 through which respective second sections 42 are received. The raised portion 48, lateral walls 52 and tabs 54 define the pair of channels 46 and limits movement of the second sections 42 such that each movable jaw 36 is moveable only towards or away from its respective fixed jaw 34. By manually sliding the movable jaws 36 away from their respective fixed jaws 34 the distance therebetween is increased whereby the clamp 30 may be selectively attached to or removed from the rearview mirror 22.

A spring 56 has an intermediate section that is positioned by a knob 58 and opposed end section 56a, 56b that are respectively engaged with a respective hook 60 provided on the moveable jaws 36. The spring 56 biases the moveable jaws 36 towards the fixed jaws 34 with sufficient force such that the clamp 30 holds the device 10 on the rearview mirror 32. The knob 58 is considered to be part of the housing 14.

It is within the scope of the invention that the device 10 can alternatively be configured such that all the jaws may be constructed to be moveable in order to attach and remove the device to a rearview mirror 32. For example, a similar arrangement described with the moveable jaws 36 may also be used instead of the fixed jaws 34.

It is also within the scope of the invention that the device 10 can alternatively be configured to be directly attached to the front windscreen 62 of a vehicle. The alternate embodiment the device 10 includes a stem and mounting base (for example, being similar to the stem 64 and mounting base 65 of the rearview mirror 32 that is shown in FIG. 1) which attaches the device 10 to the windscreen 62, instead of having clamps 30 for attaching the device 10 to a rearview mirror 32.

Figure 5A:
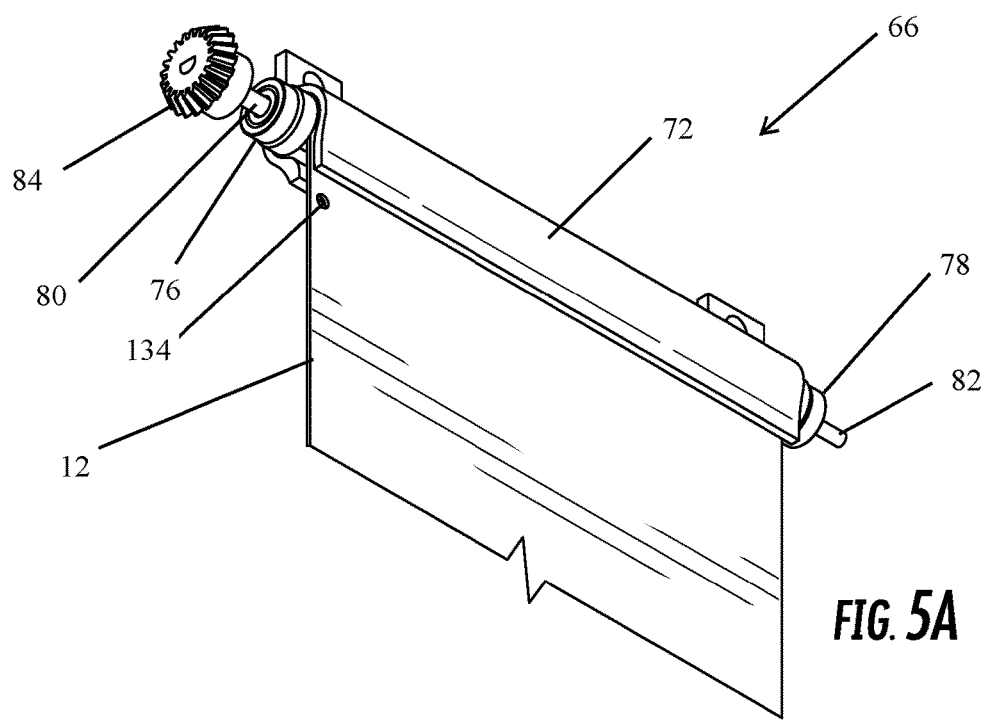
FIG. 5A is a bottom-rear perspective view of a holder assembly of the rearview mirror with integrated handicap sign of FIG. 1, for carrying a sign according to an exemplary embodiment of the invention.
Figure 5B:
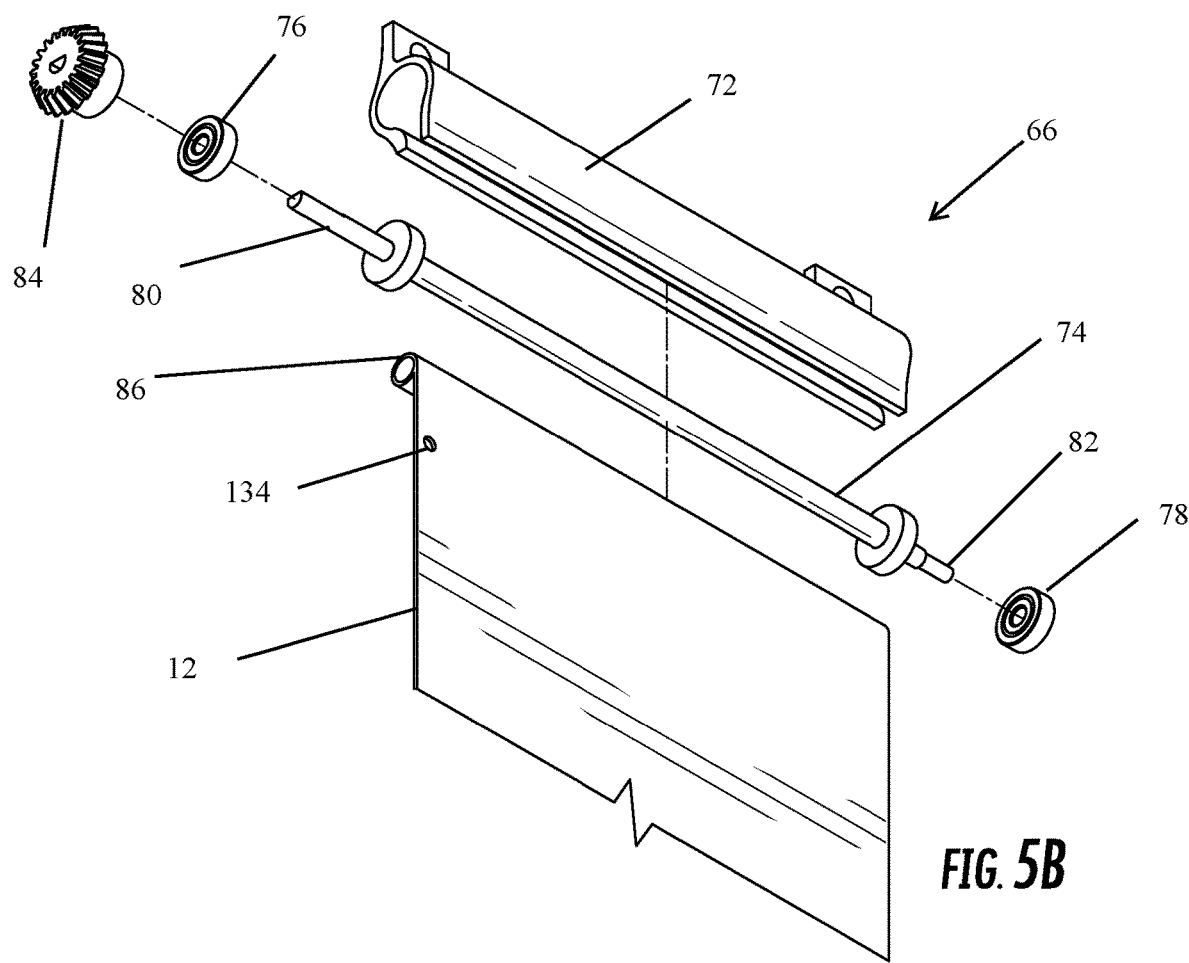
FIG. 5B is an exploded bottom-rear perspective view of the holder assembly of FIG. 5A.

The device 10 includes a holder assembly 66 (FIGS. 5A, 5B) for carrying the sign 12 and a drive assembly having at least one of a power drive assembly 68 (FIG. 6) for electronically deploying and retracting the sign 12 and a manual drive assembly 70 (FIG. 4) for manually deploying and retracting the sign 12.

Referring to FIGS. 2, 4, 5A and 5B, the holder assembly 66 includes a collar 72 mounted in the housing 14 interior to the front 18, a shaft 74 rotatably disposed within the collar 72, opposed bearings 76, 78 positioned on the end portions 80, 82 of the shaft 74, and a bevel gear 84 affixed to the terminal end of end portion 80 for engagement with the manual drive assembly 70.

The sign 12 is attached at its proximal end 86 to the shaft 74 by an adhesive or any other suitable fashion. A paper weight 88 is attached to the distal end 90 of the sign 12, by an adhesive or any other suitable fashion, to provide sufficient weight so that the sign 12 hangs external of the housing 14 downwardly and generally flat when deployed, as shown in FIG. 2. The housing base 28 has a slot 91 through which an intermediate portion of the sign 12 passes while deploying and retracting the sign 12. The sign 12 is flexible, made of textile, paper, plastic, fabric or the like, so that it rolls up about the shaft 74 when the sign 12 is being retracted and is generally flat when the sign 12 is deployed. Indicia, words, images and the like (collectively and individually the "indicia 93") are presented on the sign 12. For example, a handicap symbol 93 may be printed on the front face and/or back face of the sign 12 so that the symbol 93 is viewable when the sign 12 is in the deployed position.

Referring to FIGS. 2, 4 and 6, a pair of bearing housing 92, 94 are attached to the base 28. Each bearing housing 92, 94 includes a race 96, 98 in which the respective bearing 76 or 78 resides. Each bearing housing 92, 94 includes a base portion 99, 100 having part of the race 96 or 98 and a cover portion 101, 102 having the remaining part of the race 96 or 98. The cover portion 100, 102 is attached to the base portion 96, 98 by screws (not shown) which allows access to place the bearings 76, 78 into the respective race 96, 98 during assembly. (In FIG. 4, cover portion 101 is shown sectioned at line 4-4 with a portion of the cover portion 101 exploded from the base portion 99 and the remaining portion of the cover portion 101 in position behind the bearing 76 in order to show the positioning the cover portion 101 in position behind the bearing 76).

Referring to FIGS. 2 and 4, the manual drive assembly 70 can be used to deploy and retract the sign 12. The manual drive assembly 70 includes a scroll wheel 104 rotatably attached to the back cover 26 of the housing 14 by a shoulder screw 106. The scroll wheel 104 has a bevel gear 108 which engages and transmits rotational motion to bevel gear 84, and an undulated peripheral edge 109 for being engaged by a person's finger when manually turning the scroll wheel 104. The scroll wheel 104 is sized and positioned so that a portion or the scroll wheel 104 extends through a slot 110 in the base 28 for accessibility by a person. As such, a person may use their finger to selectively rotate the scroll wheel 104 counterclockwise which imparts rotational motion to the shaft 74, via the bevel gears 84, 108, causing shaft 74 to roll up the sign 12 into a stowed position principally within the housing 14. Similarly, a person may use their finger to selectively rotate the scroll wheel 104 clockwise which imparts rotational motion to the shaft 74, via the bevel gears 84, 108, causing shaft 74 to unroll the sign 12 to the deployed position displaying indicia 93 on the sign 12.

Referring to FIGS. 2 and 6, the sign 12 can also be deployed and retracted using the power drive assembly 68. The power drive assembly 68 includes a DC motor 112 that is affixed within the interior of the housing 14, a motor shaft 114, and a coupler 116 which joins the motor shaft 114 to the end portion 82 of the sign shaft 74 so that rotational motion from the motor shaft 114 is transmitted to the sign shaft 74 in order to deploy and retract the sign 12. It is within the scope of the invention that other means may be used to join the motor shaft 114 to the sign shaft 74 such as, for example, gears or the like.

Referring to FIG. 2, a charger (not shown) is plugged into a power outlet, for example a vehicle's cigarette lighter (not shown), to provide power to the device 10. The charger includes a DC connector on each end for respective connection to the cigarette lighter at one end and at the other end to a DC jack 118 provided on the device 10. Optionally, the charger can include an on/off switch to control whether current is provided to the device 10 while the device 10 is plugged into the cigarette lighter. In an alternative embodiment, the device may be powered by one or more batteries (not shown).

Electronics include a switch 120, an H-bridge 122, a printed circuit board, a micro controller 124 and a voltage regulator 125 for turning the DC motor 112 on and off and controlling whether the DC motor 112 turns the sign shaft 74 clockwise to deploy the sign 12 or counterclockwise to retract the sign 12. An exemplary switch is a DPDT rocker switch 120, which has three states of ON, OFF and ON but the ON states are on opposite polarity. That is, the DPDT switch 120 can be used to make the motor shaft 114 rotate clockwise or counterclockwise by change the polarity of the voltage applied. An exemplary micro controller 124 is an Adurino Pro Mini.

A pair of sensors 126, 128 are provided to signal the motor 112 to shut off when the sign 12 has reached a fully deployed position and when the sign has reached a fully retracted position. In an embodiment, the sensors are inferred sensors 126, 128, each having a channel 130, 132 through which respective lateral edges of the sign 12 pass when the sign 12 is being deployed or retracted. An example of a suitable sensor is an optical endstop switch such as a TSCT 2103 switch. The sign 12 is provided with an opening 134 near its upper left corner. Upon activation, the motor 112 will continue to deploy the sign 12 until the sensor 126 detects that the opening 134 is positioned within the channel 130 and signals to the motor 112 to stop.

Similarly, the sign 12 is also provided with an opening 136 near its bottom right corner. When retracting, the motor 112 will continue to retract the sign 12 until the opening 136 is positioned within the channel 132 and signals to the motor 112 to stop.

It is to be understood that not all electrical components and wiring are illustrated or described herein as such is within the ordinary skill in the art.

In operation, the device 10 is attached to a vehicle's rearview mirror 32 by manually sliding the moveable jaws 36 away from the fixed jaws 34 so that the span of the clamps 30 are greater than the height of the rearview mirror 32. The clamps 30 are then placed about the top and bottom of the rearview mirror 32 and the moveable jaws 36 released. The moveable jaws 36, urged by the spring 56, are drawn towards the fixed jaws 34 with sufficient force to attach and hold the device 10 to the rearview mirror 32. If desired, the device 10 can be removed from the rearview mirror 32 by manually sliding the moveable jaws 36 away from the fixed jaws 34 to remove the clamping force from the rearview mirror 32.

To provide power, one end of a charger is plugged in the vehicle's cigarette lighter, and the other end is plugged into the device's DC jack 118. To deploy the sign 12, a person presses the rocker switch 120 into the down position causing the motor 112 to turn the shaft 74 clockwise unwinding the sign 12. The sign 12 continues to unwind until sensor 126 detects opening 134 in the upper left corner of the sign 12 whereupon the motor 112 is signaled to stop. In the deployed position, indicia 93 on the sign 12 is external of the device housing 14 and thus viewable to the public.

When driving the vehicle, the sign 12 is placed in the retracted stowed position being principally within the device housing 14 in order to obviate potential obstruction of vision. To retract the sign 12, a person presses the rocker switch 120 into the up position causing the motor 112 to turn the shaft 74 counterclockwise and winding the sign 12 about the shaft 74. The sign 12 continues to be retracted until the inferred sensor 128 detects opening 136 in the lower right corner of the sign 12 wherein the motor 112 is signaled to stop.

Alternatively, a person can deploy and retract the sign 12 by manually using the scroll wheel 104. Accordingly, a person can manually rotate the scroll wheel 104 to cause the shaft 74 to turn clockwise thereby unwinding the sign 12 to the deployed position. And a person can manually rotate the scroll wheel 104 to cause the shaft to turn counterclockwise thereby winding up the sign 12 in the stowed position. Thusly, a person could still use the device 10 even if they do not have a charger. Although it is preferred that the device 10 include both the power drive assembly 68 and a manual drive assembly 70, the device 10 may be configured with only one of them.

Regardless of the foregoing detailed description of exemplary embodiments of the invention, the optimum dimensional relationships for the individual components of the invention, including variations in size, shape, thickness, form, materials, function and manner of operation, assembly and use, as well as equivalents thereof, are deemed to be readily apparent and understood by those skilled in the art. Accordingly, equivalent relationships to those shown in the accompanying drawing figures and described in the written description are intended to be encompassed by the invention, the foregoing being considered as illustrative only of the general concept and principles of the invention. Furthermore, since numerous modifications and changes will readily occur to those skilled in the art, the exemplary embodiments disclosed herein are not intended to limit the invention to the specific configuration, construction, materials and operation shown and described. Instead, all reasonably predictable and suitable equivalents and obvious modifications to the invention should be construed as falling within the scope of the invention as defined by the appended claims given their broadest reasonable interpretation in view of the accompanying written description and drawings.

That which is claimed is:

1. A rearview mirror with integrated sign, comprising:
   a housing;
   a mirror attached to the housing;
   a holder assembly attached to the housing, wherein the holder assembly includes a sign shaft, and wherein the sign shaft is capable of rotational movement;
   a sign attached to the sign shaft, wherein the sign includes indicia;
   a slot in the housing adapted for allowing the sign to move there-through; and
   at least one drive assembly functionally attached to the sign shaft and capable of rotating the sign shaft in a first direction to roll up the sign on the sign shaft in a stowed position and rotating the sign shaft in a second direction to deploy the sign in a deployed position whereby indicia on the sign are external of the housing; and
   at least one clamp attached to the housing, each of the at least one clamp being adapted for attachment to a rearview mirror, wherein each of the at least one clamp has a moveable jaw and a fixed jaw.

2. The rearview mirror with integrated sign of claim 1, wherein the moveable jaw is capable of being moved towards and away from the stationary jaw.

3. The rearview mirror with integrated sign of claim 2, further comprising a spring wherein the spring is attached to the moveable jaw and biases the moveable jaw towards the stationary jaw.

4. The rearview mirror with integrated sign of claim 3, wherein the spring is attached to the housing.

5. The rearview mirror with integrated sign of claim 2, further comprising a spring have a first end section, a second end portion and an intermediate section; wherein the at least one clamp is a first clamp and a second clamp; wherein the intermediate section of the spring is attached to the housing; wherein the first end section of the spring is attached to the moveable jaw of the first clamp and biases the moveable jaw towards the stationary jaw of the first clamp; and wherein the second end section of the spring is attached to the second clamp and the biases the moveable jaw towards the stationary jaw of the second clamp.

6. A rearview mirror with integrated sign, comprising:
a housing;
a mirror attached to the housing;
a holder assembly attached to the housing, wherein the holder assembly includes a sign shaft, and wherein the sign shaft is capable of rotational movement;
a sign attached to the sign shaft, wherein the sign includes indicia;
a slot in the housing adapted for allowing the sign to move there-through;
at least one drive assembly functionally attached to the sign shaft and capable of rotating the sign shaft in a first direction to roll up the sign on the sign shaft in a stowed position and rotating the sign shaft in a second direction to deploy the sign in a deployed position whereby indicia on the sign are external of the housing; and
wherein the at least one drive assembly is a power drive assembly comprising a motor for rotating the sign shaft and a switch for selectively turning the motor on or off, and for selectively rotating the sign shaft in the first direction or the second direction.

7. The rearview mirror with integrated sign of claim 6, further including at least one sensor, wherein the at least one sensor signals to stop the motor when the sign reaches the deployed position when deploying the sign, and signals to stop the motor when the sign reaches the stowed position when retracting the sign.

8. The rearview mirror with integrated sign of claim 7, wherein each of the at least one sensor is an inferred sensor.

9. The rearview mirror with integrated sign of claim 6, wherein the at least one sensor is a first inferred sensor and a second inferred sensor; wherein the sign includes a first opening in a lower portion of the sign and a second opening in an upper portion of the sign; wherein upon activation of the motor to rotate the sign shaft in the first direction, the sign shaft will continue to rotate in the first direction and roll up the sign until the sensor detects the first opening and signals the motor to stop; and wherein upon activation of the motor to rotate the sign shaft in the second direction, the sign shaft will continue to rotate in the second direction and deploy the sign until the sensor detects second opening and signals the motor to stop.

10. A rearview mirror with integrated sign, comprising:
a housing;
a mirror attached to the housing;
a holder assembly attached to the housing, wherein the holder assembly includes a sign shaft, and wherein the sign shaft is capable of rotational movement;
a sign attached to the sign shaft, wherein the sign includes indicia;
a slot in the housing adapted for allowing the sign to move there-through;
at least one drive assembly functionally attached to the sign shaft and capable of rotating the sign shaft in a first direction to roll up the sign on the sign shaft in a stowed position and rotating the sign shaft in a second direction to deploy the sign in a deployed position whereby indicia on the sign are external of the housing; and
wherein the drive assembly is a manual drive assembly comprising a manually rotated scroll wheel for selectively rotating the sign shaft in the first direction or the second direction.

11. The rearview mirror with integrated sign of claim 10, wherein the scroll wheel includes a gear which engages a gear on the sign shaft whereby rotation of the scroll wheel in a first direction imparts rotation of the sign shaft in the first direction and rotation of the scroll wheel in a second direction imparts rotation of the sign shaft in the second direction.

12. The rearview mirror with integrated sign of claim 11, wherein the housing includes a slot; and wherein a portion of the scroll wheel is within the housing and a portion of the scroll wheel extends through the slot for being accessible by a person for manually operating the scroll wheel.

13. A rearview mirror with integrated sign, comprising:
a housing;
a mirror attached to the housing;
a holder assembly attached to the housing, wherein the holder assembly includes a sign shaft, and wherein the sign shaft is capable of rotational movement;
a sign attached to the sign shaft, wherein the sign includes indicia;
a slot in the housing adapted for allowing the sign to move there-through;
at least one drive assembly functionally attached to the sign shaft and capable of rotating the sign shaft in a first direction to roll up the sign on the sign shaft in a stowed position and rotating the sign shaft in a second direction to deploy the sign in a deployed position whereby indicia on the sign are external of the housing; and
wherein the at least one drive assembly is a power drive assembly and a manual drive assembly; wherein the power drive assembly includes a motor for rotating the sign shaft and a switch for selectively turning the motor on or off, and for selectively rotating the sign shaft in the first direction or the second direction; and wherein the manual drive assembly includes a manually rotated scroll wheel for selectively rotating the sign shaft in the first direction or the second direction.

14. The rearview mirror with integrated sign of claim 13, further comprising at least one clamp attached to the housing, each of the at least one clamp being adapted for attachment to a rearview mirror.

15. The rearview mirror with integrated sign of claim 14, wherein the power drive assembly further includes at least one sensor, wherein the sensor signals to stop the motor when the sign reaches the deployed position when deploying the sign, and signals to stop the motor when the sign reaches the stowed position when retracting the sign.

16. The rearview mirror with integrated sign of claim 15, wherein the at least one sensor is a first inferred sensor and a second inferred sensor; wherein the sign includes a first opening in a lower portion of the sign and a second opening in an upper portion of the sign; wherein upon activation of the motor to rotate the sign shaft in the first direction, the sign shaft will continue to rotate in the first direction and roll up the sign until the sensor detects the first opening and signals the motor to stop; and wherein upon activation of the motor to rotate the sign shaft in the second direction, the sign shaft will continue to rotate in the second direction and deploy the sign until the sensor detects second opening and signals the motor to stop.

17. The rearview mirror with integrated sign of claim 16, wherein the scroll wheel includes a gear which engages a gear on the sign shaft whereby rotation of the scroll wheel in a first direction imparts rotation of the sign shaft in the first direction and rotation of the scroll wheel in a second direction imparts rotation of the sign shaft in the second direction.

18. The rearview mirror with integrated sign of claim 17, wherein the housing includes a slot; and wherein a portion of the scroll wheel is within the housing and a portion of the scroll wheel extends through the slot for being accessible by a person for operating the scroll wheel.

* * * * *